May 7, 1957  J. A. KENDER  2,791,060
COMBINED FISH HOOK, FLOAT AND SINKER ASSEMBLY
Filed July 9, 1953
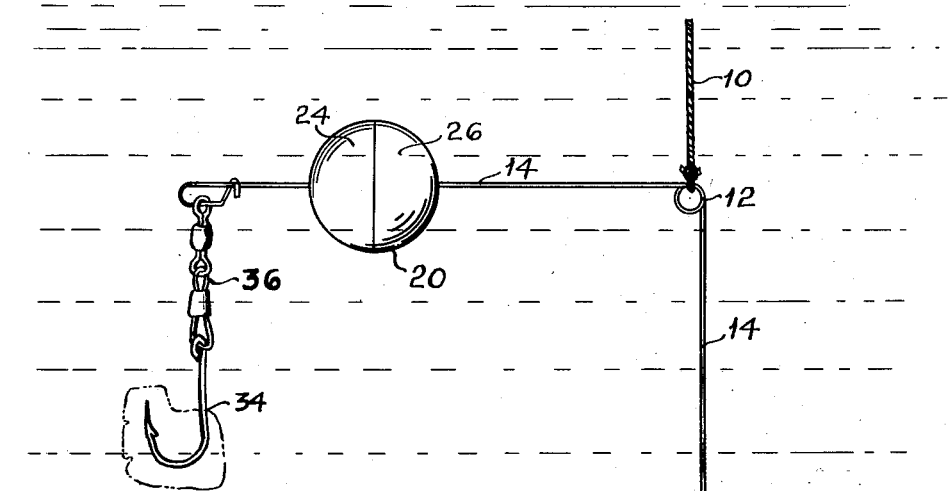
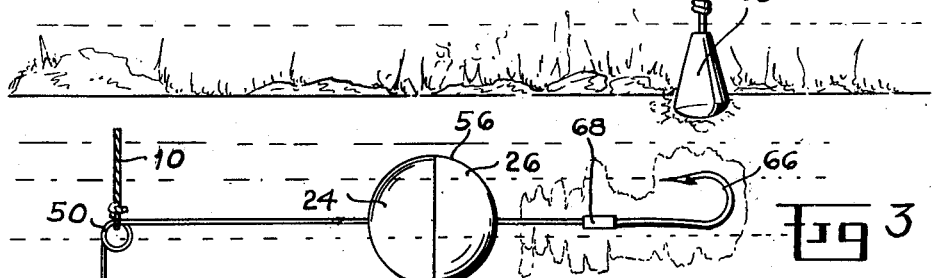
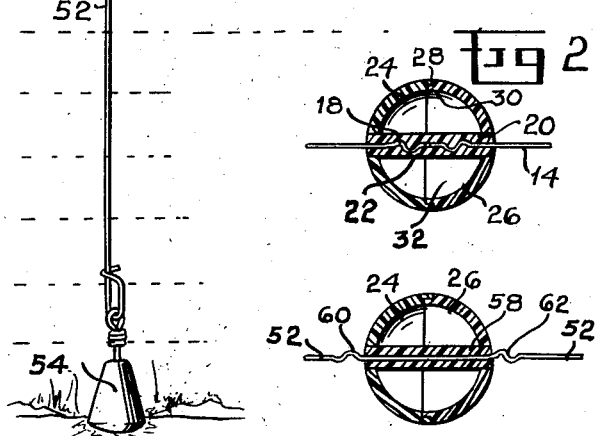
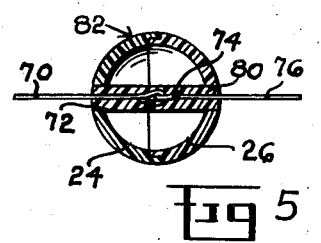
INVENTOR.
John A. Kender
BY
Henry S. Dybvig
HIS ATTORNEY United States Patent Office 2,791,060
Patented May 7, 1957

2,791,060

COMBINED FISH HOOK, FLOAT, AND SINKER ASSEMBLY

John A. Kender, Dayton, Ohio

Application July 9, 1953, Serial No. 366,985

4 Claims. (Cl. 43—44.9)

This invention relates to a combined fish hook, float and sinker assembly for use in fishing near the bottom of a body of water, although not necessarily so limited.

In fishing for certain types of fish, such as cat fish or channel fish, it has been found that these are found very near the bottom of a body of water, usually on the order of a few inches from the bottom.

It is an object of this invention to provide a support for a hook, the support being attached to a fish line, such that the hook will be held in a predetermined spaced relation from the bed of a body of water.

Another object of this invention is to provide a float adapted to be submerged, wherein the float is provided with a core member in which a hook supporting member is embedded, this core member being surrounded and having sealed thereto a shell providing an air cavity or vacuum cavity to produce the desired buoyancy.

Another object of this invention is to provide a support for a fish hook and sinker and a float that consists of a wire-like member having a coil portion intermediate the ends thereof, so that one end projects downwardly and supports a sinker and the other end projects in a generally horizontal direction and supports a buoyant member and a fish hook.

Other objects and advantages reside in the construction of parts, the combination thereof and the mode of operation, as will become more apparent from the following description.

In the drawings, Figure 1 discloses a preferred embodiment of the combined fish hook, float and sinker assembly.

Figure 2 is a cross sectional view of the float shown in Figure 1.

Figure 3 is a view similar to Fig. 1 showing a modification of a fish hook, float and sinker assembly.

Figure 4 is a cross sectional view of the float shown in Figure 3.

Figure 5 is a view similar to Figs. 2 and 4 and discloses another modification of a float.

Referring to the drawings, the reference character 10 indicates a fish line supporting a fish hook, a float and a sinker assembly. The fish line 10 is attached to a loop 12 consisting of one or more convolutions of wire 14, the lower end of which forms one leg that may be substantially vertically disposed and that supports the sinker 16, and the horizontal portion forms another leg which projects into a float assembly 20, which will now be described.

This float assembly 20 includes a core member 22 made of plastic molding material and having embedded therein the wire 14 that is crimped, as shown at 18. This core member 22 has mounted thereon two semi-spherical halves 24 and 26. The semi-spherical half 24 is provided with a flange 28 overlapping a flange 30 integral with member 26. The two flanges 28 and 30 are sealed together. This may be accomplished by utilizing a solvent for the plastic molding material used in molding the halves 24 and 26, so as to soften the contacting margins of the flanges, so that when they are brought together, a homogeneous union is formed. Instead of using a solvent, the two halves may be press-fitted or cemented together.

Each of the halves 24 and 26 is provided with a hole in which the core member 22 projects, the ends of the core member 22 being sealed to the halves 24 and 26 in a manner similar to the manner used in sealing the two semi-spherical halves together, namely, by using a solvent for softening the peripheral margin of the core member 22 and the walls of the holes or apertures in members 24 and 26, or by securing the parts together in any other suitable manner. This results in a float having a space 32 which may form an air pocket or it may be filled with a suitable gas, so as to have the necessary buoyancy. The wire 14 projects through the float and the outer end of the wire supports a fish hook 34 through suitable link mechanism 36. From this it may readily be seen that the baited hook is always in the same relative position with respect to the bed of the water.

In the modification disclosed in Figure 3, the line 10 is attached to a loop 50 formed in the wire 52. The lower end of the wire 52 supports a sinker 54. The horizontal portion of the wire 52, as disclosed in Figure 3, supports a float 56, consisting of two halves 24 and 26, identical to the halves described in connection with the preferred embodiment.

A core member 58, as disclosed in Figure 4, is provided with an aperture through which the horizontal portion of the wire 52 extends. The wire has been crimped at 60 and 62, so as to hold the float in position. The float consists of two halves 24 and 26, identical to the two halves 24 and 26 described in connection with the preferred embodiment. The hook 66 is attached by suitable coupling means 68 to the horizontal portion of the wire 52.

In the modification disclosed in Figure 5, a wire 70 substantially identical to the wires 14 and 52 as far as the support of the sinker and line is concerned, terminates in an eye 72 linking an eye 74 of the shank 76 of a hook (not shown). The two eyes 72 and 74, together with the end of the wire 70 and the end of the shank 76, have been embedded during the molding operation into the core member 80 of the float 82. The two halves 24 and 26 of the float are substantially identical to the two halves described in connection with the preferred embodiment and the preferred modification.

In the preferred embodiment and in each of the modifications, the hook and bait are suspended in spaced relation from the bed of the body of water. For certain types of fishing, it is very important that the hook and bait be suspended in a substantially exact distance from the bed. For example, channel fish is usually found a few inches from the bed of the body of water. In order to catch this type of fish, it is absolutely essential that the hook be maintained in proper spaced relation from the bed.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A float assembly for use in holding a fish hook by means of a wire, said float assembly including a core member having the wire provided with an arcuate portion fixedly embedded therein during the molding operation, two substantially semi-spherical hollow halves each provided with an aperture in the center thereof, the halves having overlapping portions telescopically arranged and sealed together, the core member having its ends snugly seated in the apertures of the halves and sealed thereto so as to provide a buoyant float.

2. A float assembly according to claim 1, wherein the arcuate portion of the wire embedded is crimped.

3. A float assembly according to claim 1, wherein the arcuate portion of the wire is a loop engaging an eye of the fish hook, the eye of the fish hook and the loop of the wire being embedded in the core member.

4. The method of producing a float assembly for use in holding a fish hook by means of a wire, said method including the molding of a cylindrical core member with a wire provided with an arcuate portion embedded therein, molding two substantially semi-cylindrical hollow halves, each of the hollow halves being provided with an aperture in the center thereof, the halves having overlapping portions telescopically arranged, sealing the two halves together with the core member positioned in the apertures, and sealing the ends of the core member to the walls surrounding the apertures of the semi-spherical halves so as to produce a hollow float assembly.

References Cited in the file of this patent
UNITED STATES PATENTS

| | | |
|---|---|---|
| 46,453 | Decker | Feb. 21, 1865 |
| 127,218 | Brown et al. | May 28, 1872 |
| 241,150 | Norwood | May 10, 1881 |
| 641,613 | Shakespeare et al. | Apr. 9, 1901 |
| 779,744 | Shakespeare | Jan. 10, 1905 |
| 1,720,287 | Moore | July 9, 1929 |
| 1,897,291 | Andrews | Feb. 14, 1933 |
| 1,991,253 | Kerns | Feb. 12, 1935 |
| 2,157,819 | Eckert | May 9, 1939 |
| 2,501,634 | Rector | Mar. 21, 1950 |
| 2,540,716 | Deimler | Feb. 6, 1951 |
| 2,543,293 | Leitch et al. | Feb. 27, 1951 |
| 2,672,704 | Smith | Mar. 23, 1954 |
| 2,693,049 | Atton | Nov. 2, 1954 |
| 2,720,720 | Landrum | Oct. 18, 1955 |